Nov. 27, 1923.
A. MULL
1,475,853
TIRE INFLATING NIPPLE
Filed June 18, 1921
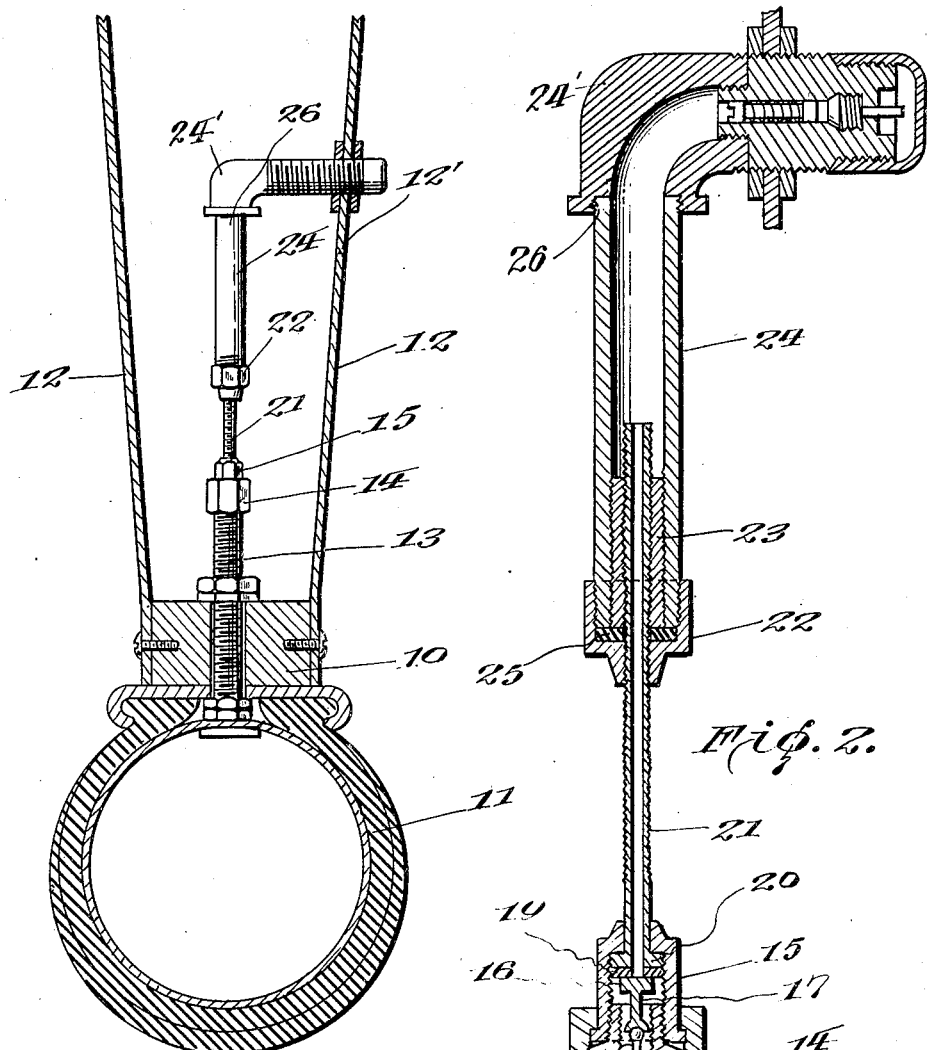
Fig. 1.
Fig. 2.
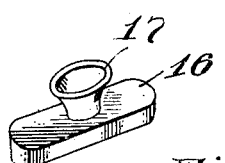
Fig. 3.
Inventor:
Arthur Mull.
Attorneys.

Patented Nov. 27, 1923.

1,475,853

UNITED STATES PATENT OFFICE.

ARTHUR MULL, OF CHICAGO, ILLINOIS.

TIRE-INFLATING NIPPLE.

Application filed June 18, 1921. Serial No. 478,636.

*To all whom it may concern:*

Be it known that I, ARTHUR MULL, a citizen of the United States, residing at Chicago, in the county of Cook and State of Illinois, have invented certain new and useful Improvements in Tire-Inflating Nipples; and I do hereby declare the following to be a full, clear, and exact description of the invention, such as will enable others skilled in the art to which it appertains to make and use the same.

This invention relates to new and useful improvements in inflating devices and particularly to pneumatic tire inflating devices.

The invention is especially designed for use in connection with automobile wheels which have the metal disks secured to the rims and hubs, and is of such construction that attachment to the tire valve stem is rendered easy.

One object of the invention is to provide a device of this character which is simple in construction, and which is readily capable of being lengthened or shortened, to suit the conditions and sizes of the wheels.

Other objects and advantages will be apparent from the following description when taken in connection with the accompanying drawing.

In the drawing.

Figure 1 is a vertical longitudinal sectional view through a portion of a wheel equipped with the inflating device.

Figure 2 is an enlarged vertical longitudinal central sectional view through the inflating device, and a portion of the tire valve stem.

Figure 3 is an inverted perspective view of the valve depressor 16.

Referring particularly to the accompanying drawing, 10 represents the rim, 11 the tire, 12 the metal disks, and 13 the valve stem. Engaged on the upper end of the valve stem 13 is a cap nut 14, which receives therethrough a smaller cap 15, which is screwed onto the reduced upper end of the valve stem 13. Within the cap 15 is a segmental plate 16 having a downwardly extending stem 17 for engagement with the end of the rod 18.

Above the disk 16, within the cap 15, is a washer ring 19, and disposed above the washer ring is the disk head 20 of the upwardly extending hollow stem 21, of the connector. The hollow stem 21 is externally threaded through its length and is engaged through a cap nut 22, and into an externally and internally threaded sleeve 23. The sleeve 23 is threaded into a pipe or tube 24, while the cap nut 22 is engaged with the pipe externally thereof. A washer 25 is engaged on the steam 21, between the cap nut 22 and the adjacent end of the pipe. On the upper end of the tube or pipe 24 there is mounted a valved member 24', of conventional form, which maintains air within the tire, and provides for indicating the air pressure within the tire. It will be noted that the valve rod 18 is shown as depressed, so that the valve is open. It will be understood that the valve may be held in partially open position, or completely open position, as desired.

In one of the disks 12 there is provided an access opening 12' through which may be reached the upper threaded end of the pipe 24, for attachment of a hose for supplying air to the tire.

By reason of the adjustability of the stem 21, the nipple 26 may be moved upwardly or downwardly so that it may be disposed with its upper end opposite the opening 12', of the disk, for ready application and removal therefrom of the usual air hose.

What is claimed is:

The combination with the valve stem of a tire, the valve rod therein, a flanged cap on the valve stem; a hollow tube having flanged end retained within the cap and a centrally appertured washer on said flanged end, of a plate of a width less than the internal diameter of the said cap and disposed within the cap against the aperture of the washer and having a stem engaging on the rod of the valve to depress the same against the spring thereof, said plate being movable away from the aperture of the washer by air pressure driven through the said hollow tube whereby air will pass around the longer sides of the plate.

In testimony whereof, I affix my signature in the presence of two witnesses.

ARTHUR MULL.

Witnesses:
MRS. ARTHUR MULL,
L. F. GAEL.